June 7, 1932. J. R. BRUECKNER ET AL 1,862,107
MACHINE FOR PREPARING METAL FOR ELECTRIC WELDING
Filed Oct. 23, 1926 2 Sheets-Sheet 1
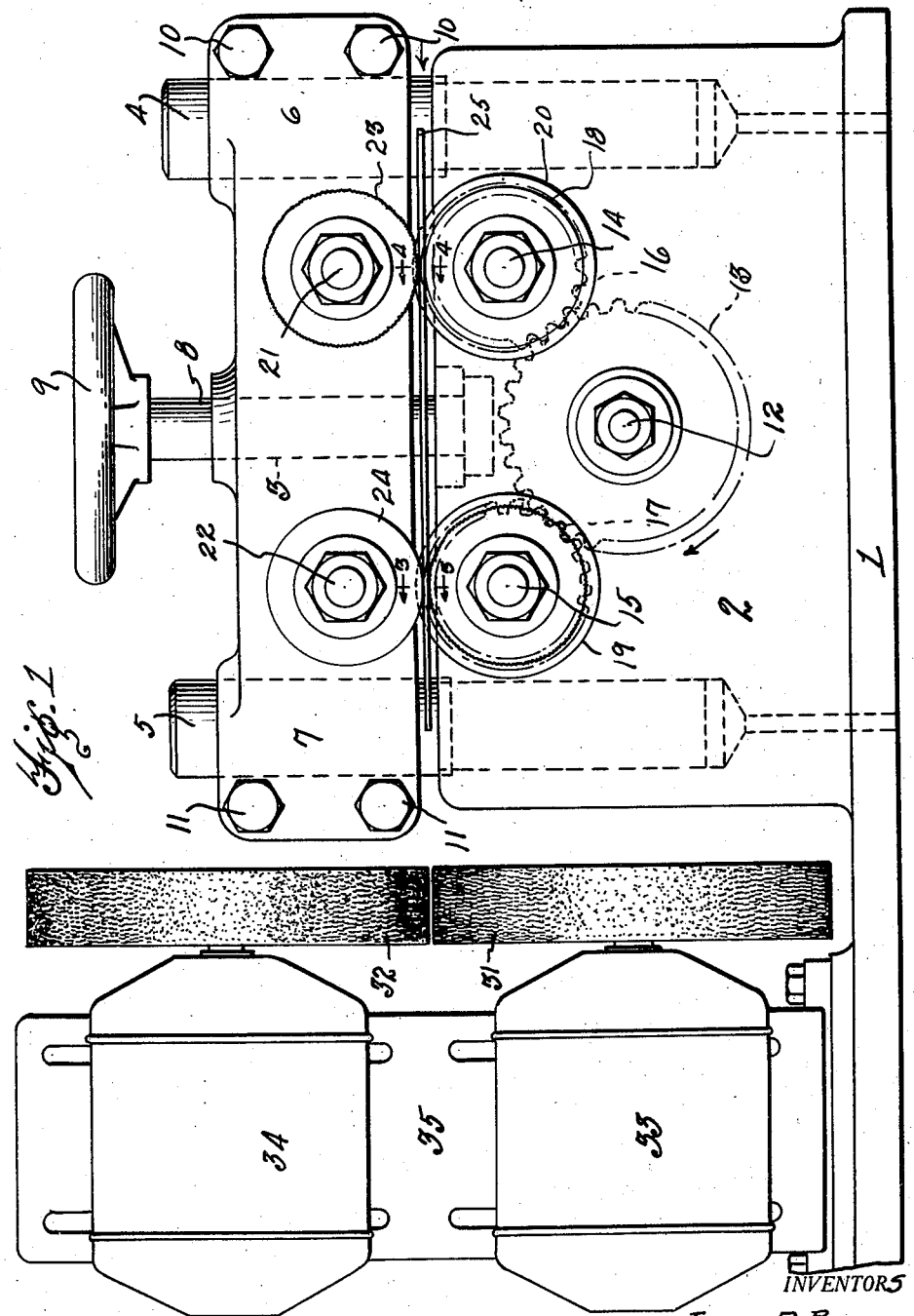

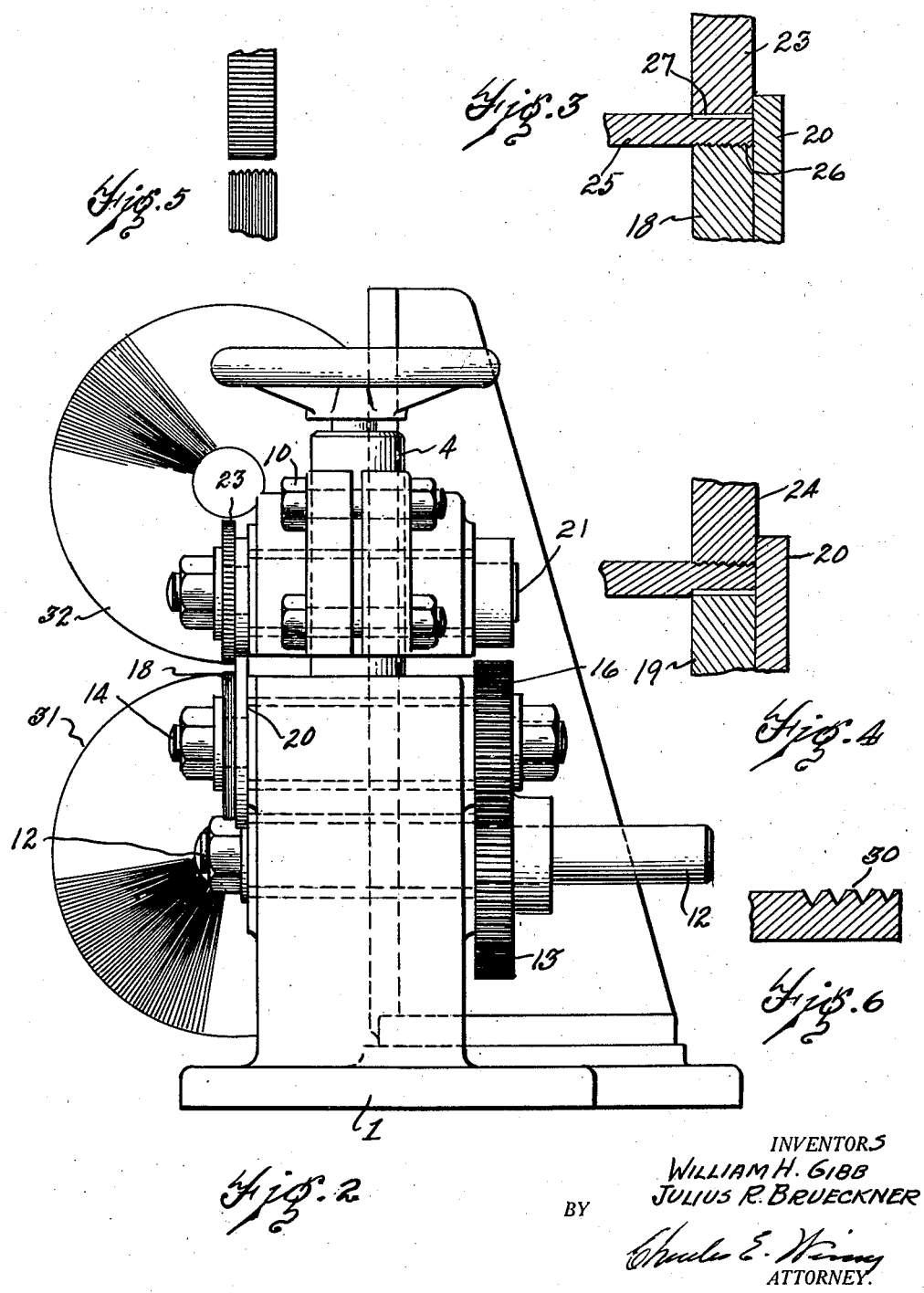

Patented June 7, 1932

1,862,107

UNITED STATES PATENT OFFICE

JULIUS R. BRUECKNER AND WILLIAM H. GIBB, OF DETROIT, MICHIGAN, ASSIGNORS TO THOMSON-GIBB ELECTRIC WELDING COMPANY, OF LYNN, MASSACHUSETTS, A CORPORATION OF MASSACHUSETTS

MACHINE FOR PREPARING METAL FOR ELECTRIC WELDING

Application filed October 23, 1926. Serial No. 143,553.

This invention relates to a machine for preparing metal surfaces for electric welding, and its object is to provide a simple and efficient means for mechanically treating the metal so that portion thereof which is to be welded to another surface of the same character is scarified or knurled to provide a series of cone or pyramid like forms separated by depressions in order that two such surfaces when held in superimposed relation and electric current passed across the joint, the points of metal in contact become welded.

A further object is to provide a machine of the character stated in which the edge of a sheet may be scarified by cross lines forming grooves in both surfaces and defining high points therein adjacent the edge of the sheet and thus preparing it for lap welding with another similarly prepared sheet.

A further object of the invention is to provide a machine having rolls operating under pressure to traverse the surface tending to cut thereinto to dislodge and loosen the scale and in conjunction therewith is provided a brushing means automatically cleaning the treated surface of scale subsequent to its passage through the rolls.

Various means have heretofore been employed to clear the scale from a metal surface to be electrically welded and we have discovered that the metal may be scarified or knurled by use of grooved or toothed rollers to loosen the scale which can then be readily brushed from the surface and by formation of the rolls the surface of the sheet is cut into thereby exposing clean metal.

A feature of this machine is in the arrangement of the rolls to cut into the surface in such manner as to leave only a series of points practically flush with the surface of the metal and from which any scale not actually loosened by passage through the rolls may readily be removed by the brushes.

These objects and the various other features of the invention are hereinafter more fully described and claimed, and the preferred form of construction of apparatus embodying our invention is shown in the accompanying drawings in which—

Fig. 1 is a front elevation of the machine showing a sheet of metal being passed therethrough.

Fig. 2 is an end view taken from the right side of Fig. 1.

Fig. 3 is a sectional view showing a sheet being treated by an upper and a lower roll having teeth or grooves defining teeth formed in the surface in opposite directions in the respective rolls.

Fig. 4 is a similar view showing the rolls in the reverse relation through which the sheet is passed subsequent to passing those shown in Fig. 3.

Fig. 5 is a detail showing a face view of the rolls indicated in Fig. 3.

Fig. 6 is an enlarged cross section of a treated metal sheet.

The machine in its preferred form consists of a base 1 having the upright portion 2 thereon and a head 3 thereabove. The base is provided with threaded sockets for the studs 4 and 5 respectively, and the head has split bearings 6 and 7 fitting over the upper ends of these studs and respectively adapted to be clamped thereon by bolts 10 and 11. The head is slidable on these studs by means of the screw shaft 8 provided at its upper end with the hand wheel 9 and at its lower end rotatably secured in the base in any approved manner. By loosening the nuts 10 and 11 which fasten the bearings 6 and 7 to the studs and rotating the hand wheel the head may be raised or lowered to the desired position whereby various thicknesses of metal may be accommodated as will be understood hereinafter. The base 2 carries a shaft 12 which may be driven in any approved manner from some convenient source of power. On this shaft on the rear side of the machine is a gear 13. Also mounted in this base 2 are shafts 14 and 15 provided with gears 16 and 17 respectively meshing with the gear 13 and driven thereby in the same direction of rotation, the main gear 13 being driven in the direction indicated by the arrow in Fig. 1. On the opposite side or the front of the machine are the scarifying or knurling rolls 18 and 19 and these rolls are each provided with a flange 20. Carried by the head 3 are additional shafts 21 and 22 on which is mounted a scarifying roll 23 and 24 respectively and in vertical alignment respectively with the rollers 18 and 19. By varying the distance apart of the head and base by means of the screw 8 the rolls are spaced properly for thickness of the metal to be passed therebetween. This metal is indicated in Fig. 1 at 25 and passes through the machine in the direction of the arrow indicated at the right side of Fig. 1.

The rolls have toothed or grooved faces as will be understood from Figs. 3, 4 and 5. Fig. 3 indicates a section of the metal being treated and of the rolls in engagement therewith. It will be noted from this view that the roll 18 for instance is formed by circumferential grooves defining teeth 26 while the companion roll 23 is provided with transverse grooves forming teeth 27. The metal sheet in passing these two rolls of Fig. 3 has the lower surface grooved longitudinally at its edge and its upper surface grooved transversely at its edge and the flange 20 of the lower roll limits the extent of introduction of the sheet to between the rolls longitudinally of their axes and this flange provides a guide for this purpose particularly when the surface to be welded is at the edge of the sheet being prepared for welding. It is to be understood of course that any portion of the surface of a metal sheet might be scarified or knurled for the purpose of welding another similarly prepared sheet thereto and it is within the spirit and scope of this invention to dispense with the flange 20 should it be so desired.

After the sheet of metal being treated passes the first rolls 18 and 23 it then passes between the rolls 19 and 24 and these latter rolls are arranged in reverse relation to those of the first pair—that is, the roll 24 is circumferentially grooved and the roll 19 transversely grooved. The sheet in passing between the first pair of rolls has grooves cut into the top surface at a right angle to its edge and as its surface then passes through the rolls 24, grooves are cut in the opposite direction—that is, parallel to the edge of the sheet and crossing the first groove at a right angle thereto. Similarly the sheet in passing the roll 18 has grooves formed therein parallel with the edge of the sheet on its lower surface and then passes to the roll 19 where grooves at a right angle thereto are cut into the edge of the sheet. This forms a surface with a series of comparatively minute cones or pyramid like points at the surface, the spaces defining the same being below the surface with apices at the surface. It is to be noted in the enlarged section of metal shown in Fig. 6 subsequent to its treatment that these cones or pyramids are truncated indicating that the teeth do not cut into the metal to the bottom of the groove in the roll although it may cut to such depth if desired. In the preferred method there are small flat surfaces 30 at the surface of the sheet which provide a better metal contact between the two superimposed surfaces thus prepared than would be the case if the cones or pyramids were formed with a sharp point at the surface of the sheet.

The purpose of knurling and scarifying the metal is firstly to secure a clean surface. Evidently, due to the teeth of the rolls cutting into the surfaces of the metal, the cut surface is a clean surface free from scale. We have also found that, by thus treating the metal by cutting rolls, the scale upon the surface of the metal before treatment is loosened and broken up and this loosened or dislodged scale is removed from the treated surface by passing the same between rotating wire brushes 31 and 32 preferably rotating in a direction transversely of the movement of the sheet and cleaning the treated surface of the scale. These brushes may be rotated in any approved manner here being shown as being independently operated by motors 33 and 34 respectively mounted on a convenient standard 35 secured to the base 1 of the machine. In passing through these rolls any scale that tends to adhere to the flat portions 30 of these little cones or pyramids is readily removed and the entire surface of the metal to be subjected to the welding operation is therefore in a clean state free from scale and deleterious matter.

The second purpose of scarifying the surface to be welded is to secure a surface that will weld practically uniformly throughout its extent and this is true for the reason that in the area of weld is a series of comparatively minute points in contact and in passing through the roller electrodes (which is the usual method of seam welding), the current which passes between the two sheets across the joint is diverted to the points in actual contact and thus the density of current at the point of weld is increased and a seam is secured that is in effect "spot" welded.

The preferred method of scarifying and knurling the surface to be treated is one in which the surface is treated to provide points or surfaces of small area uniformly arranged and separated by air spaces in order to secure this spot welding effect but it is to be understood that the form of scarifying roller may be varied from that which is here shown and may be so varied that the points, surfaces, pyramids or areas providing a metallic contact between similarly treated sheets are not uniformly distributed. It is evident that with the uniform arrangement of the pyramids or areas, the points on the upper sheet might register with the depressions of the lower sheet. Therefore, non-uniformity in the arrangement of the points or ridges of the treated sheets tend to obviate such difficulty. This point is not of material importance in practical operation but serves to indicate possibility of varying the form and arrangement of faces of the scarifying or knurling rolls, the purpose of which is to provide minute areas separated by spaces cut to below the surfaces of the sheet to provide a clean metal surface at the cut points and to loosen the scale and finally remove the same from the metal previous to the welding operation.

From the foregoing description it is evident that the machine is simple in construction and extremely simple in operation in that the operator only needs to pass the sheet to be treated through the machine which automatically knurls the surface or areas to be welded and clears the sheet of deleterious matter.

Having thus briefly described our invention, what we claim and desire to secure by Letters Patent of the United States is—

1. In a machine for treating metal while in the cold state preparatory to electric welding similarly prepared sheets comprising a base member, a pair of scarifying rollers upon one side thereof, the face of one roller having cutting teeth to cut into the surface of a sheet to form parallel lines thereon and the other roller having teeth adapted to cut into the said lines at an angle, a head adjustable relative to the base, a series of scarifying rollers each in vertical alignment respectively with a roller of said first pair and likewise adapted to cut into the surface of the sheet forming crossed lines therein, means for applying pressure to the rollers, guide means limiting the extent to which the sheet is introduced to between the rollers longitudinally of their axes, and a pair of rotating wire brushes for brushing the opposite sides of the sheet subsequent to passing the rollers.

2. A machine for treating metal while in the cold state preparatory to the electric welding of similarly prepared metal sheets comprising a framework, a series of rotatable rollers supported thereon in pairs in opposed relation, the faces of the rollers having cutting teeth, means limiting the extent to which the metal is introduced between the rollers in a direction transversely of the movement of the sheet whereby the edge of the sheet only is subjected to the rollers, a pair of independently operated wire brushes, one for the upper and one for the lower surface of the sheet adapted to brush the surface and clean the same of scale as it passes from the rollers, means for driving the rollers, and means for applying pressure to the rollers to cause the same to cut into the sheet.

3. A machine for preparing metal while in the cold state for subsequent electric welding to provide a lapped seam comprising a framework, a pair of scarifying rolls supported on one side of the framework to permit an edge of the sheet to be introduced therebetween, means limiting the extent to which the metal to be treated may be introduced between the rolls longitudinally of their axes, the rolls having teeth to cut into the surface of the sheet whereby rotation of the scarifying rolls causes the metal to feed through the machine, and a brush rotating in a direction transversely of the direction of movement of the sheet to which the said treated edge is submitted as it passes from the rolls.

In testimony whereof we sign this specification.

WILLIAM H. GIBB.
JULIUS R. BRUECKNER.